United States Patent [19]

Story et al.

[11] Patent Number: 5,740,452
[45] Date of Patent: Apr. 14, 1998

[54] SYSTEM FOR PASSING INDUSTRY STANDARD ARCHITECTURE (ISA) LEGACY INTERRUPTS ACROSS PERIPHERAL COMPONENT INTERCONNECT (PCI) CONNECTORS AND METHODS THEREFOR

[75] Inventors: Franklyn H. Story, Chandler; David R. Evoy, Tempe, both of Ariz.

[73] Assignee: VLSI Technology, Inc., San Jose, Calif.

[21] Appl. No.: 624,169

[22] Filed: Mar. 29, 1996

[51] Int. Cl.⁶ .................................................. G06F 13/24
[52] U.S. Cl. ........................................................ 395/734
[58] Field of Search ............................. 395/733, 734, 395/735, 868

[56] References Cited

U.S. PATENT DOCUMENTS

| | | | |
|---|---|---|---|
| 4,443,866 | 4/1984 | Burgiss, Sr. | 395/281 |
| 4,890,219 | 12/1989 | Heath et al. | 395/733 |
| 5,506,997 | 4/1996 | Maguire et al. | 395/800 |
| 5,535,420 | 7/1996 | Kardach et al. | 395/868 |
| 5,555,413 | 9/1996 | Lohman et al. | 395/733 |
| 5,555,430 | 9/1996 | Gephardt et al. | 395/800 |
| 5,603,050 | 2/1997 | Wolford et al. | 395/821 |
| 5,619,703 | 4/1997 | Omid et al. | 395/734 |

OTHER PUBLICATIONS

"PCI Local Bus Specification" Revision 2.0 Apr. 30, 1993 p. 15, Section 2.2.6.

Primary Examiner—Ayaz R. Sheikh
Attorney, Agent, or Firm—Harry M. Weiss; Jeffrey D. Moy; Harry M. Weiss & Associates, P.C.

[57] ABSTRACT

The present invention relates to a system and method for passing Industry Standard Architecture (ISA) legacy interrupts across Peripheral Component Interconnect (PCI) connectors. The system interconnects a plurality of PCI devices coupled to a PCI bus such that a last interrupt pin of each of the plurality of PCI devices are coupled together in a directly bussed manner to provide a serial interrupt signal line. The remainder of the interrupt pins of each of the plurality of PCI devices are coupled together in a barber pole manner.

17 Claims, 1 Drawing Sheet

SYSTEM FOR PASSING INDUSTRY STANDARD ARCHITECTURE (ISA) LEGACY INTERRUPTS ACROSS PERIPHERAL COMPONENT INTERCONNECT (PCI) CONNECTORS AND METHODS THEREFOR

BACKGROUND OF THE INVENTION

1. Field of the Invention

This invention relates generally to computer systems and, more specifically, to a system and method for passing Industry Standard Architecture (ISA) legacy interrupts across Peripheral Component Interconnect (PCI) connectors.

2. Description of the Prior Art

To support ISA bus legacy interrupts in the PCI bus environment with a minimal number of pins, a serial interrupt bus was defined by the Serialized IRQ/Data for PCI Systems Specification and later incorporated by reference into the Common Architecture Specification. This serial interrupt signalling exists as a sideband signal in the PCI environment. A sideband signal is loosely defined as any signal not part of the PCI specification that connects two or more PCI compliant agents, and has meaning only to these agents. Sideband signals may be used by two or more devices to communicate some aspect of their device specific state in order to improve the overall effectiveness of PCI utilization or system operation.

Serial interrupt signalling can not be realized across PCI connectors since the PCI connectors are defined without any provisions for sideband signals. Therefore, sideband signals must be limited to the planar environment. Plug-in cards that required support for ISA legacy interrupts were used to implement various sideband signals in a cable separate from the PCI connector. However, the plug-in cards required an additional motherboard connection which is undesirable.

Therefore, a need existed to provide a system and method for passing ISA legacy interrupts across PCI connectors. The system and method must provide for the ability to pass the ISA legacy interrupts across PCI connectors without the need for a separate cable for sideband signals. The system and method must also provide for a dual mode of operation for the PCI connector: a native PCI mode that is the default mode, and an ISA legacy mode which may be optionally invoked.

SUMMARY OF THE INVENTION

In accordance with one embodiment of the present invention, it is an object of the present invention to provide a system and method for passing ISA legacy interrupts across PCI connectors.

It is another object of the present invention to provide a system and method for passing ISA legacy interrupts across PCI connectors without the need for a separate cable for sideband signals.

It is still another object of the present invention to provide a system and method for passing ISA legacy interrupts across PCI connectors without the need for a separate cable for sideband signals and which provides for a dual mode of operation for the PCI connector: a native PCI mode that is the default mode, and an ISA legacy mode which may be optionally invoked.

BRIEF DESCRIPTION OF THE PREFERRED EMBODIMENTS

In accordance with one embodiment of the present invention, a system for passing ISA legacy interrupts across PCI connectors is disclosed. The system is comprised of a PCI bus and a plurality of PCI devices coupled to the PCI bus. Each of the plurality of PCI devices have the same number of interrupt pins wherein that number is up to four interrupt pins. The up to four interrupt pins of each of the plurality of PCI devices are coupled together so that a last interrupt pin of the up to four interrupt pins of each of the plurality of PCI devices are coupled together in a directly bussed manner to provide a serial interrupt signal line. The remainder of the up to four interrupt pins of each of the plurality of PCI devices are coupled together in a barber pole manner. In the preferred embodiment of the present invention, the plurality of PCI devices number four.

In accordance with another embodiment of the present invention, a method of providing a system for passing ISA legacy interrupts across PCI connectors is disclosed. The method is comprised of the steps of: providing a PCI bus; providing a first PCI device coupled to the PCI bus and having up to four interrupt pins; and providing a second PCI device coupled to the PCI bus and having up to four interrupt pins, a last interrupt pin of the up to four interrupt pins of the second PCI device being coupled to a last interrupt pin of the up to four interrupt pins of the first PCI device in a directly bussed manner to provide a serial interrupt signal line, and a remainder of the up to four interrupt pins of the second PCI device being coupled to a remainder of the up to four interrupt pins of the first PCI device in a barber pole manner. The method may further comprise the step of providing a third PCI device coupled to the PCI bus and having up to four interrupt pins, a last interrupt pin of the up to four interrupt pins of the third PCI device being coupled to the last interrupt pin of the up to four interrupt pins of the second PCI device in a directly bussed manner to provide a serial interrupt signal line, and a remainder of the up to four interrupt pins of the third PCI device being coupled to the remainder of the up to four interrupt pins of the second PCI device in a barber pole manner. A fourth PCI device may also be coupled to the PCI bus. The fourth PCI device will have up to four interrupt pins, a last interrupt pin of the up to four interrupt pins of the fourth PCI device being coupled to the last interrupt pin of the up to four interrupt pins of the third PCI device in a directly bussed manner to provide a serial interrupt signal line, and a remainder of the up to four interrupt pins of the fourth PCI device being coupled to the remainder of the up to four interrupt pins of the third PCI device in a barber pole manner.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

The Peripheral Component Interconnect (PCI) bus defines four level sensitive interrupt pins that have their pin characteristics and signalling defined by the PCI Local Bus Specification. These pins are active low, open drain outputs that may be Wired-ORed together. The low asynchronous assertion of an interrupt signal creates a continuous interrupt request to the host controller until the cause of the interrupt request is cleared by the device driver software that is associated with the PCI device generating the interrupt condition.

Figure 1:
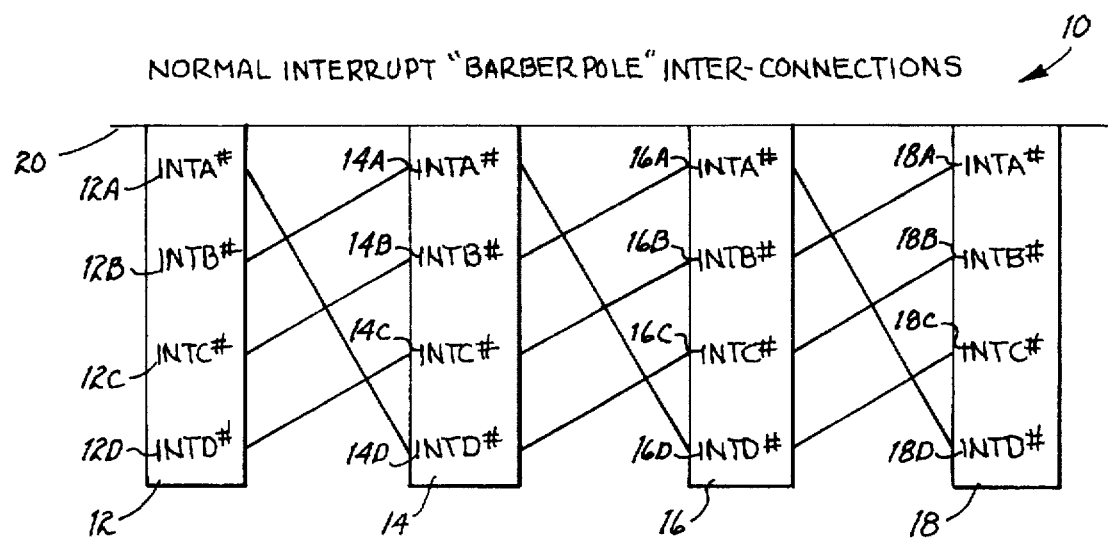
FIG. 1 is a simplified block diagram of the prior art system wherein the interrupt pins on successive PCI devices/connectors are interconnected in a barber pole fashion.

The PCI specification contains a recommendation that the four interrupt pins on successive PCI devices be interconnected in a barber pole fashion. Referring to FIG. 1, a prior art system 10 is shown. The system 10 is comprised of a plurality of PCI devices 12, 14, 16, and 18 coupled to a PCI bus 20. Each of the PCI devices 12, 14, 16, and 18 have four interrupt pins 12A–12D, 14A–14D, 16A–16D, and 18A–18D respectively. The interrupt pins on successive PCI devices are interconnected in a barber pole fashion such that the following interconnections are made. The first interrupt pin 12A of the first PCI device 12 is coupled to the last interrupt pin 14D of the second PCI device 14, the second interrupt pin 12B of the first PCI device 12 is coupled to the first interrupt pin 14A of the second PCI device 14, the third interrupt pin 12C of the first PCI device 12 is coupled to the second interrupt pin 14B of the second PCI device 14, and the fourth interrupt pin 12D of the first PCI device 12 is coupled to the third interrupt pin 14C of the second PCI device 14. In a similar manner, the interrupt pins 14A–14D of the second PCI device 14 are coupled to the interrupt pins 16A–16D of the third PCI device 16 in a barber pole fashion, and the interrupt pins 16A–16D of the third PCI device 16 are coupled to the interrupt pins 18A–18D of the fourth PCI device 18 in a barber pole fashion. Thus, the first interrupt pin 14A of the second PCI device 14 is coupled to the last interrupt pin 16D of the third PCI device 16, the second interrupt pin 14B of the second PCI device 14 is coupled to the first interrupt pin 16A of the third PCI device 16, the third interrupt pin 14C of the second PCI device 14 is coupled to the second interrupt pin 16B of the third PCI device 16, and the fourth interrupt pin 14D of the second PCI device 14 is coupled to the third interrupt pin 16C of the third PCI device 16. Similarly, the first interrupt pin 16A of the third PCI device 16 is coupled to the last interrupt pin 18D of the fourth PCI device 18, the second interrupt pin 16B of the third PCI device 16 is coupled to the first interrupt pin 18A of the fourth PCI device 18, the third interrupt pin 16C of the third PCI device 16 is coupled to the second interrupt pin 18B of the fourth PCI device 18, and the fourth interrupt pin 16D of the third PCI device 16 is coupled to the third interrupt pin 18C of the fourth PCI device 18.

The serial interrupt bus is a single data pin that has its pin characteristics and signalling defined by the Serialized IRQ/Data for PCI System Specification. These pins are active high, three state Input/Outputs (I/Os) that may be Wired-ORed together. The signalling protocol is synchronous to the PCI clock. The signalling protocol is based on a "packet" of a "start frame", up to thirty-two (32) "data frames", and a "stop frame". Each frame has a "sample" state when the frame's signal can be active, a "recovery" state when the frame's signal is returned to the inactive state, and a "turnaround" state when the frame's signal is three-stated. Each data frame is associated with a different interrupt whose current state in the peripheral device is transmitted to the host controller in every packet, no matter which device initiated the packet.

Although PCI interrupt signalling and serial interrupt bus signalling are very different, the motherboard pin support requirements are similar in that both modes of operation require a single pull-up resistor to be connected to the pins. Thus, the prior art system 10 (FIG. 1) may be modified to provide the benefits of the serial interrupt bus to add-in PCI devices whose host interface is limited to PCI connector pins.

Figure 2:
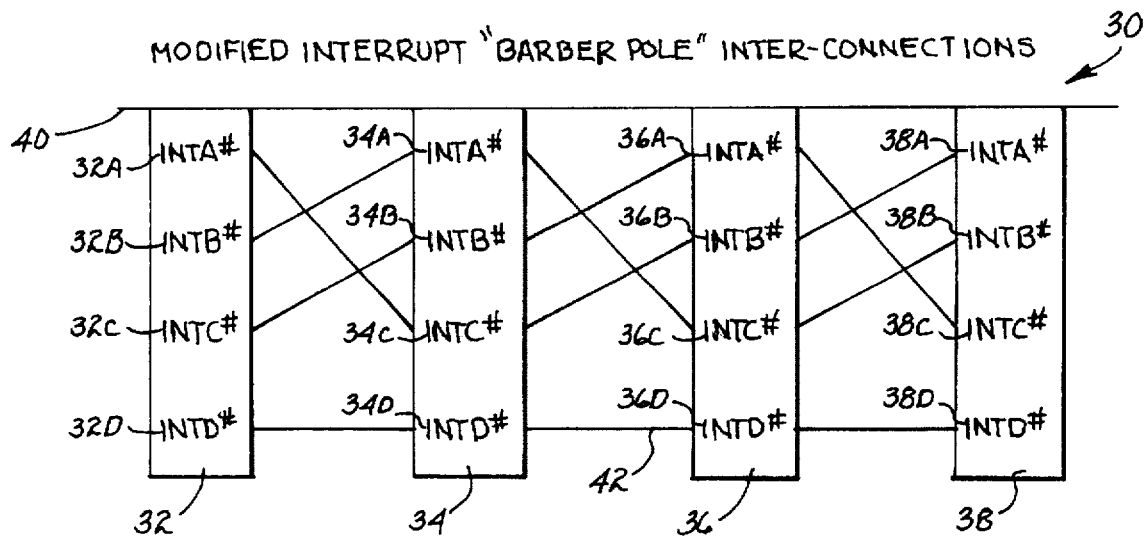
FIG. 2 is a simplified block diagram of a system for passing ISA legacy interrupts across PCI connectors wherein the interrupt pins on successive PCI devices/connectors are interconnected in a modified barber pole fashion.

Referring to FIG. 2, a system for passing ISA legacy interrupts across PCI connectors (hereinafter system 30) is shown. The system 30 modifies the barber pole connections of the prior art system 10 (FIG. 1). Like the system 10 shown in FIG. 1, the system 30 is comprised of a plurality of PCI devices 32, 34, 36, and 38 coupled to a PCI bus 40. Each of the PCI devices 32, 34, 36, and 38 have four interrupt pins 32A–32D, 34A–34D, 36A–36D, and 38A–38D respectively. The first three interrupt pins of successive devices are coupled together in a barber pole fashion. Thus, the first interrupt pin 32A of the first PCI device 32 is coupled to the third interrupt pin 34C of the second PCI device 34 which is coupled to the second interrupt pin 36B of the third PCI device 36 which is coupled to the first interrupt pin 38A of the fourth PCI device 38. In a similar manner, the second interrupt pin 32B of the first PCI device 32 is coupled to the first interrupt pin 34A of the second PCI device 34 which is coupled to the third interrupt pin 36C of the third PCI device 36 which is coupled to the second interrupt pin 38B of the fourth PCI device 38. Likewise, the third interrupt pin 32C of the first PCI device 32 is coupled to the second interrupt pin 34B of the second PCI device 34 which is coupled to the first interrupt pin 36A of the third PCI device 36 which is coupled to the third interrupt pin 38C of the fourth PCI device 38. The fourth interrupt pins 32D, 34D, 36D and 38D of each of the devices 32, 34, 36, and 38 respectively are coupled together in a directly bussed manner to form a serial interrupt signal line 42. Thus, the fourth interrupt pin 32D of the first PCI device 32 is coupled to the fourth interrupt pin 34D of the second PCI device 34 which is coupled to the fourth interrupt pin 36D of the third PCI device 36 which is coupled to the fourth interruption 38D of the fourth PCI device 38.

The system 30 retains the feature of spreading the interrupts evenly amongst the interrupt pins in the system 30 whose PCI devices 32, 34, 36, and 38 each have no more than three interrupts. However, the fourth interrupt pins 32D, 34D, 26D, and 38D are now configured as a common architecture serial interrupt signal line 42 as long as all of the PCI devices 32, 34, 36, and 38 identify themselves as having three or less PCI interrupts. Since most devices today rarely have more than one interrupt, the system 30 should be applicable for most PCI devices. However, in order to ensure that the system 30 will function, one should examine the interrupt pin configuration register of each function of the PCI device. If any PCI device possess four PCI interrupts, then the fourth interrupt must remain configured as a PCI interrupt.

The system 30 is designed to operate under two modes of operation. The first mode of operation is the default mode. The default mode is a "native" PCI mode. In the PCI mode, the interrupt pins are open drain outputs. PCI mode interrupts are enabled by device-specific configuration bits that cause the interrupt pins to be driven low when any enabled interrupt source is active.

The second mode of operation is an ISA legacy mode. By setting a PCI configuration bit, common architecture serial interrupt signalling is enabled. In this mode of operation, the interrupt pins are a three-state output. The input is enabled to allow monitoring of the state of the serial interrupt signal line 42. Instead of causing the interrupt pin to be driven low, enabled interrupt sources cause the generation of serial interrupt packets over the serial interrupt signal bus. When the enabled interrupt frame occurs in the serial packet, the interrupt pin is driven as detailed by the Serialized IRQ/Data For PCI Systems Specification.

While the invention has been particularly shown and described with reference to a preferred embodiment thereof, it should be understood by those skilled in the art that changes in form and detail may be made therein without departing from the spirit and scope of the invention.

We claim:

1. A system for passing Industry Standard Architecture (ISA) legacy interrupts across Peripheral Component Interconnect (PCI) connectors comprising, in combination:

a PCI bus;

a plurality of PCI connectors coupled to said PCI bus, each of said plurality of PCI connectors having a same number of interrupt pins connected to each of said PCI connectors, said interrupt pins of each of said plurality of PCI connectors being coupled together so a last interrupt pin of said interrupt pins of each of said plurality of PCI connectors are coupled together in a directly bussed manner to provide a serial interrupt signal line and a remainder of said interrupt pins of each of said plurality of PCI connectors being coupled together in a manner to support PCI Local Bus Specifications; and configuration bit means for selecting between a native PCI mode of operation and a ISA legacy mode of operation for said system, said configuration bit means causing said interrupt pins of each of said plurality of PCI connectors to be open drain outputs which are driven low when an enable interrupt source is active when said configuration bit means are set to operate in said native PCI mode of operation and enabled interrupt sources causing generation of serial interrupt packets over said serial interrupt signal line when said configuration bit means are set for said ISA legacy mode of operation.

2. A system for passing ISA legacy interrupts across PCI connectors in accordance with claim 1 wherein said number of interrupt pins of each of said plurality of PCI connectors is four.

3. A system for passing ISA legacy interrupts across PCI connectors in accordance with claim 1 wherein said plurality of PCI connectors is at least two.

4. A system for passing ISA legacy interrupts across PCI connectors in accordance with claim 1 wherein said remainder of said interrupt pins of each of said plurality of PCI connectors are coupled together in a barber pole manner.

5. A system for passing ISA legacy interrupts across PCI connectors comprising, in combination:

a PCI bus;

a first PCI connector coupled to said PCI bus and having interrupt pins; and a second PCI connector coupled to said PCI bus and having interrupt pins, a last interrupt pin of said second PCI connector is coupled to a last interrupt pin of said first PCI connector in a directly bussed manner to provide a serial interrupt signal line, and a remainder of said interrupt pins of said second PCI connector are coupled to a remainder of said interrupt pins of said first PCI connector in a manner to support PCI Local Bus Specifications; and configuration bit means for selecting between a native PCI mode of operation and a ISA legacy mode of operation for said system, said configuration bit means causing said interrupt pins of each PCI connector to be open drain outputs which are driven low when an enable interrupt source is active when said configuration bit means are set to operate in said native PCI mode of operation and enabled interrupt sources causing generation of serial interrupt packets over said serial interrupt signal line when said configuration bit means are set for said ISA legacy mode of operation.

6. A system for passing ISA legacy interrupts across PCI connectors in accordance with claim 5 wherein a first interrupt pin of said first PCI connector is coupled to a third interrupt pin of said second PCI connector, a second interrupt pin of said first PCI connector is coupled to a first interrupt pin of said second PCI connector, a third interrupt pin of said first PCI connector is coupled to a second interrupt pin of said second PCI connector, and a fourth interrupt pin of said first PCI connector is coupled to a fourth interrupt pin of said second PCI connector.

7. A system for passing ISA legacy interrupts across PCI connectors in accordance with claim 6 further comprising a third PCI connector coupled to said PCI bus and having interrupt pins, a last interrupt pin of said third PCI connector is coupled to said last interrupt pin of said interrupt pins of said second PCI connector in a directly bussed manner to provide a serial interrupt signal line, and a remainder of said interrupt pins of said third PCI connector are coupled to said remainder of said interrupt pins of said second PCI connector in a manner to support PCI Local Bus Specifications.

8. A system for passing ISA legacy interrupts across PCI connectors in accordance with claim 7 wherein said first interrupt pin of said second PCI connector is coupled to a third interrupt pin of said third PCI connector, said second interrupt pin of said second PCI connector is coupled to a first interrupt pin of said third PCI connector, said third interrupt pin of said second PCI connector is coupled to a second interrupt pin of said third PCI connector, and said fourth interrupt pin of said second PCI connector is coupled to a fourth interrupt pin of said third PCI connector.

9. A system for passing ISA legacy interrupts across PCI connectors in accordance with claim 8 further comprising a fourth PCI connector coupled to said PCI bus and having interrupt pins, a last interrupt pin of said interrupt pins of said fourth PCI connector is coupled to said last interrupt pin of said interrupt pins of said third PCI connector in a directly bussed manner to provide a serial interrupt signal line, and a remainder of said interrupt pins of said fourth PCI connector are coupled to said remainder of said interrupt pins of said third PCI connector in a manner to support PCI Local Bus Specifications.

10. A system for passing ISA legacy interrupts across PCI connectors in accordance with claim 9 wherein said first interrupt pin of said third PCI connector is coupled to a third interrupt pin of said fourth PCI connector, said second interrupt pin of said third PCI connector is coupled to a first interrupt pin of said fourth PCI connector, said third interrupt pin of said third PCI connector is coupled to a second interrupt pin of said fourth PCI connector, and said fourth interrupt pin of said third PCI connector is coupled to a fourth interrupt pin of said fourth PCI connector.

11. A system for passing ISA legacy interrupts across PCI connectors comprising, in combination:

a PCI bus;

a first PCI connector coupled to said PCI bus;

a second PCI connector coupled to said PCI bus and to said first PCI connector, a first interrupt pin of said first PCI connector is coupled to a third interrupt pin of said second PCI connector, a second interrupt pin of said first PCI connector is coupled to a first interrupt pin of said second PCI connector, a third interrupt pin of said first PCI connector is coupled to a second interrupt pin of said second PCI connector, and a fourth interrupt pin of said first PCI connector is coupled to a fourth interrupt pin of said second PCI connector;

a third PCI connector coupled to said PCI bus and to said second PCI connector, said first interrupt pin of said second PCI connector is coupled to a third interrupt pin of said third PCI connector, said second interrupt pin of said second PCI connector is coupled to a first interrupt pin of said third PCI connector, said third interrupt pin of said second PCI connector is coupled to a second interrupt pin of said third PCI connector, and said fourth interrupt pin of said second PCI connector is coupled to a fourth interrupt pin of said third PCI connector;

a fourth PCI connector coupled to said PCI bus and to said third PCI connector, said first interrupt pin of said third PCI connector is coupled to a third interrupt pin of said fourth PCI connector, said second interrupt pin of said third PCI connector is coupled to a first interrupt pin of said fourth PCI connector, said third interrupt pin of said third PCI connector is coupled to a second interrupt pin of said fourth PCI connector, and said fourth interrupt pin of said third PCI connector is coupled to a fourth interrupt pin of said fourth PCI connector; and configuration bit means for selecting between a native PCI mode of operation and a ISA legacy mode of operation for said system, said configuration bit means causing said interrupt pins of each PCI connector to be open drain outputs which are driven low when an enable interrupt source is active when said configuration bit means are set to operate in said native PCI mode of operation and enabled interrupt sources causing generation of serial interrupt packets over said serial interrupt signal line when said configuration bit means are set for said ISA legacy mode of operation.

12. A method of providing a system for passing ISA legacy interrupts across PCI connectors comprising the steps of:

providing a PCI bus;

providing a first PCI connector coupled to said PCI bus and having up to four interrupt pins;

providing a second PCI connector coupled to said PCI bus and having up to four interrupt pins, a last interrupt pin of said up to four interrupt pins of said second PCI connector is coupled to a last interrupt pin of said up to four interrupt pins of said first PCI connector in a directly bussed manner to provide a serial interrupt signal line, and a remainder of said up to four interrupt pins of said second PCI connector are coupled to a remainder of said up to four interrupt pins of said first PCI connector in a manner to support PCI Local Bus Specifications; and providing configuration bit means for selecting between a native PCI mode of operation and a ISA legacy mode of operation for said system, said configuration bit means causing said interrupt pins of each PCI connectors to be open drain outputs which are driven low when an enable interrupt source is active when said configuration bit means are set to operate in said native PCI mode of operation and enabled interrupt sources causing generation of serial interrupt packets over said serial interrupt signal line when said configuration bit means are set for said ISA legacy mode of operation.

13. The method of claim 12 further comprising the steps of:

coupling a first interrupt pin of said first PCI connector to a third interrupt pin of said second PCI connector;

coupling a second interrupt pin of said first PCI connector to a first interrupt pin of said second PCI connector;

coupling a third interrupt pin of said first PCI connector to a second interrupt pin of said second PCI connector; and coupling a fourth interrupt pin of said first PCI connector to a fourth interrupt pin of said second PCI connector.

14. The method of claim 12 further comprising the step of providing a third PCI connector coupled to said PCI bus and having up to four interrupt pins, a last interrupt pin of said up to four interrupt pins of said third PCI connector is coupled to said last interrupt pin of said up to four interrupt pins of said second PCI connector in a directly bussed manner to provide a serial interrupt signal line, and a remainder of said up to four interrupt pins of said third PCI connector are coupled to said remainder of said up to four interrupt pins of said second PCI connector in a manner to support PCI Local Bus Specifications.

15. The method of claim 14 further comprising the steps of:

coupling said first interrupt pin of said second PCI connector to a third interrupt pin of said third PCI connector;

coupling said second interrupt pin of said second PCI connector to a first interrupt pin of said third PCI connector;

coupling said third interrupt pin of said second PCI connector to a second interrupt pin of said third PCI connector; and coupling said fourth interrupt pin of said second PCI connector to a fourth interrupt pin of said third PCI connector.

16. The method of claim 14 further comprising the step of providing a fourth PCI connector coupled to said PCI bus and having up to four interrupt pins, a last interrupt pin of said up to four interrupt pins of said fourth PCI connector is coupled to said last interrupt pin of said up to four interrupt pins of said third PCI connector in a directly bussed manner to provide a serial interrupt signal line, and a remainder of said up to four interrupt pins of said fourth PCI connector are coupled to said remainder of said up to four interrupt pins of said third PCI connector in a manner to support PCI Local Bus Specifications.

17. The method of claim 16 further comprising the steps of:

coupling said first interrupt pin of said third PCI connector to a third interrupt pin of said fourth PCI connector;

coupling said second interrupt pin of said third PCI connector to a first interrupt pin of said fourth PCI connector;

coupling said third interrupt pin of said third PCI connector to a second interrupt pin of said fourth PCI connector, and coupling said fourth interrupt pin of said third PCI connector to a fourth interrupt pin of said fourth PCI connector.

\* \* \* \* \*